United States Patent [19]

Sato et al.

[11] Patent Number: 5,222,519
[45] Date of Patent: Jun. 29, 1993

[54] REVERSE-FLOW PREVENTION DEVICE FOR FUEL TANK

[75] Inventors: Kyokuichi Sato; Juichi Fujita, both of Soja, Japan

[73] Assignee: OM Industrial Co., Ltd., Okayama, Japan

[21] Appl. No.: 720,597

[22] Filed: Jun. 25, 1991

[30] Foreign Application Priority Data

Jun. 30, 1990 [JP] Japan .................. 2-70076[U]

[51] Int. Cl.$^5$ .................................. F16K 15/03
[52] U.S. Cl. .......................... 137/512.1; 137/515
[58] Field of Search ........................ 137/512.1, 515

[56] References Cited

U.S. PATENT DOCUMENTS

| | | | |
|---|---|---|---|
| 1,023,885 | 4/1912 | Smyth | 137/512.1 |
| 2,976,882 | 3/1961 | Cowan | 137/512.1 |
| 4,406,022 | 9/1983 | Roy | 137/512.1 X |
| 4,416,029 | 11/1983 | Kaster | 137/512.1 X |
| 4,774,981 | 10/1988 | Mizusawa | 137/512.1 X |

Primary Examiner—Gerald A. Michalsky
Attorney, Agent, or Firm—Koda and Androlia

[57] ABSTRACT

The present invention relates to a reverse-flow prevention device for a fuel tank of an automobile which is provided between a filler port and the fuel tank in the automobile. The reverse-flow prevention device of the invention comprises a valve body of which circular interior space is divided into three to six sector-shaped regions and which includes a support bar provided in alignment with the division lines, and three to six valve discs having configurations to be closely fitted in the sector-shaped regions of the valve body and rotating around the support bar. Bearings of the support bar for rotation of the valve discs are provided with rotation-restriction sections which control the valve discs to rotate within a range of not more than 90° as well as in one direction.

1 Claim, 5 Drawing Sheets

REVERSE-FLOW PREVENTION DEVICE FOR FUEL TANK

BACKGROUND OF THE INVENTION

1. Field of the Invention

The present invention relates to a reverse-flow prevention device for a fuel tank of an automobile which is provided between a fuel filler port and the fuel tank in the automobile.

2. Prior Art

Conventionally, a reverse-flow prevention device for a fuel tank, which has a function to open a filler pipe when fuel flows normally during supply of the fuel and to close the filler pipe when the fuel spits back to flow reversely, comprises component parts such as a valve body, one valve disc, a rotational axis pin and so on, which are manufactured independently of one another. This type of reverse-flow prevention device requires such work as to flatten the top end of the rotational axis pin so that it may not be disconnected after the rotational axis pin is assembled at a bearing portion for the valve disc.

In the case where the reverse-flow prevention valve for the fuel tank comprises one valve disc, it is necessary to locate the reverse-flow prevention valve at the attachment position where the direction of the valve is so controlled that the reverse-flow prevention valve may operate correctly. More particularly, the valve body is provided with locating projections and the pipe to be connected includes locating recesses, and by engaging the projections of the valve body with the recesses of the pipe, the direction of the valve is set optimumly. This is for the purpose of directing the valve in such direction that it is always closed by its own weight, thereby ensuring quick response of the valve when the fuel flows reversely and making the resistance against the fuel as little as possible when it is supplied. Alternatively, in a state that the valve disc is closed, when the rotational axis pin of the bearing portion is cohered with burning tar material or foreign matters so that there occurs a rotational failure of the valve disc, it may be impossible to supply the fuel to the automobile.

Further, the fuel flows turbulently in a filler pipe during being supplied. This is one cause for deteriorating an efficiency of feeding the fuel. Accordingly, it is preferable to introduce the fuel in a laminar flow.

In order to feed the fluid in the filler pipe stably in a state like as the laminar flow, such type of reverse-flow prevention device is also applicable that two valve discs having generally half-circular shapes are used and closed by force of springs (for example, U.S. Pat. No. 4,867,199). However, when the fuel flows only through the lower half of the filler pipe, the fuel flow cannot be rectified sufficiently by means of the valve discs owing to an unfavorable attachment angle of the valve discs, even in the case where the valve discs are two. Moreover, since the valve discs are required to be opened against the force of the springs, this type of device has a disadvantageous point such that the resistance against the fuel flow is increased.

SUMMARY OF THE INVENTION

As a result of taking the above-described problem into account, a noble reverse-flow prevention device for a fuel tank is developed; the reverse-flow prevention device for the fuel tank according to the invention comprises a valve body of which circular interior space is divided into three to six sector-shaped regions and which includes a support bar extending in alignment with the division lines, and valve discs having configurations to be closely fitted in the sector-shaped interior regions of the valve body and rotating around the support bar, the reverse-flow prevention device being characterized in that bearings of the support bar for rotation of the valve discs are provided with rotation-restriction sections for controlling the valve discs to rotate within a range of not more than 90° as well as in one direction.

Each of the three, four, five or six divided valve discs includes a structure which comprises: a plate-like valve-movable portion which can substantially closely fit in the sector-shaped interior region of the valve body; a rotational locus restriction portion which is provided on the proximal side of the valve-movable portion so as to contact with the rotation-restriction section of the support bar; shaft portions extending from the rotational locus restriction portion in a direction opposite to the valve-movable portion; and hooked stopper portions provided at the top ends of the shaft portions.

It is preferable to provide the support bar on the lines which equally divide the circular interior space of the valve body or a plane perpendicular to the axis of the valve body into three to six regions, more preferably, three to five regions. As the interior space of the valve body is divided into more regions, a larger effect of rectifying the fuel flow can be expected; however, when the number of the valve discs is increased, the opening area of the valve body is substantially reduced. In consequence, it is preferable to determine the valve discs within the above-described number.

With respect to a preferable aspect of the invention, the rotation-restriction section for controlling the valve discs to rotate within the range of not more than 90° and in one direction is arranged such that the support bar for retaining the shaft portions of the valve disc is recessed to form two stopper portions, the stopper portions being spaced at positions apart from each other by an angle of 90° where they are respectively in contact with the valve disc, or that the valve disc is provided with shaft stopper pieces with stepped portions extending rearwardly from the valve-movable portion, which stopper pieces fulfill a stopper function when it rotates on the opposite side to the valve disc and contacts with support bar, or further that the distal end portion of the valve disc is brought into contact with a control projection provided on the valve body when the rotation of the valve disc is completed.

Because the reverse-flow prevention device for the fuel tank having the above-mentioned structure suffers from few influences of the attachment direction thereof, a favorable valve action can be similarly obtained when the device is attached in any direction.

There is a possibility that fuel cannot be supplied as mentioned above due to the rotating failure of the valve disc around the shaft in case of one valve disc, and in case of two valve discs, one of the valve discs may not be closed unless the force of the spring is utilized. According to the invention, however, there are provided three or more valve discs independent of one another, whereby all the valve discs are opened and closed in a stable condition. Even if one of the valve discs cannot rotate smoothly, the remains of the valve discs have a chance to operate normally so that a possibility of failure in feeding the fuel can be avoided.

The valve discs fulfill rectifying functions when the necessary number of valve discs are provided in the fuel flow during supplying the fuel, in addition to their valve acting functions. In particular, since the device of the invention includes three or more valve discs, at least a portion of the valve discs is always dipped in the fuel even if they are attached at any angular interval, so that they can perform the rectifying functions.

There are various grades of fuels, among which there is one fuel including a high content of tar. In the case where ordinarily-used shafts and bearings are applied in the reverse-flow prevention device when such fuel is being supplied, it is judged that the valve discs do not operate favorably because the tar material sticks thereto.

Now, according to the invention, such valve disc is invented that a rotation failure due to adhesion of the tar material is restrained and moreover it can readily be assembled.

As a result, each valve disc which rotates around a support bar extending in alignment with division lines for dividing the circular interior space of a valve body into a plurality of sector-shaped regions, is constructed in such a manner that it comprises a plate-like valve-movable portion which can closely fit in the associated sector-shaped region, a rotational locus restriction portion provided at the proximal side of the valve-movable portion so as to contact with a rotation-restriction section of the support bar, shaft portions projecting from the rotational locus restriction portion in a direction opposite to the valve-movable portion, and hooked stopper portions provided at the distal end portions of the shaft portions.

The configuration of the valve-movable portion is the same as that of the sector-shaped region defined when the circular interior space of the valve body is divided into three to six regions.

The rotational locus restriction portion is adapted for controlling the valve disc to rotate in a circle at the center of the bearing. It is the rotation-restriction section that restricts a rotating range of the valve body within not more than 90°. The rotational angle of the valve body is determined by adjusting a gap between the stopper portions with respect to the thickness of the valve plate.

The stepped portion is provided between the valve-movable portion and the shaft portions of the valve disc for the purpose of preventing the valve disc from overlapping the adjacent valve disc when it is closed.

The shaft portions of the valve disc can be inserted into the bearing portion provided in the support bar because the shaft portions are deformed. Further, provided that the hooked stopper portions are formed to be deformable, the shaft portions and hooked stopper portions and the bearing portions can be satisfactorily overlapped so that the shaft portions will not be disconnected from the bearing portions. Also, it becomes easier to assemble the valve disc and the bearing portion of the support bar.

With the above-described structure, because the reverse-flow prevention device of the invention includes the plurality of valve-movable portions, that is, valve discs, either valve disc is always dipped in the fuel so as to rectify the fuel flow even if the valve disc selects any attachment angle.

When the shaft portions of the valve disc is deformed, the hooked stopper portions at their distal ends are thereby engaged with the elongated hole of the support bar.

The deformation of the hooked stopper portions at the distal ends of the shaft portions permits the shaft portions to be mounted on the support bar more readily, while the shaft portions being deformed, or alternatively even if the shaft portions cannot be deformed.

DETAILED DESCRIPTION OF THE PREFERRED EMBODIMENTS

Figure 1:
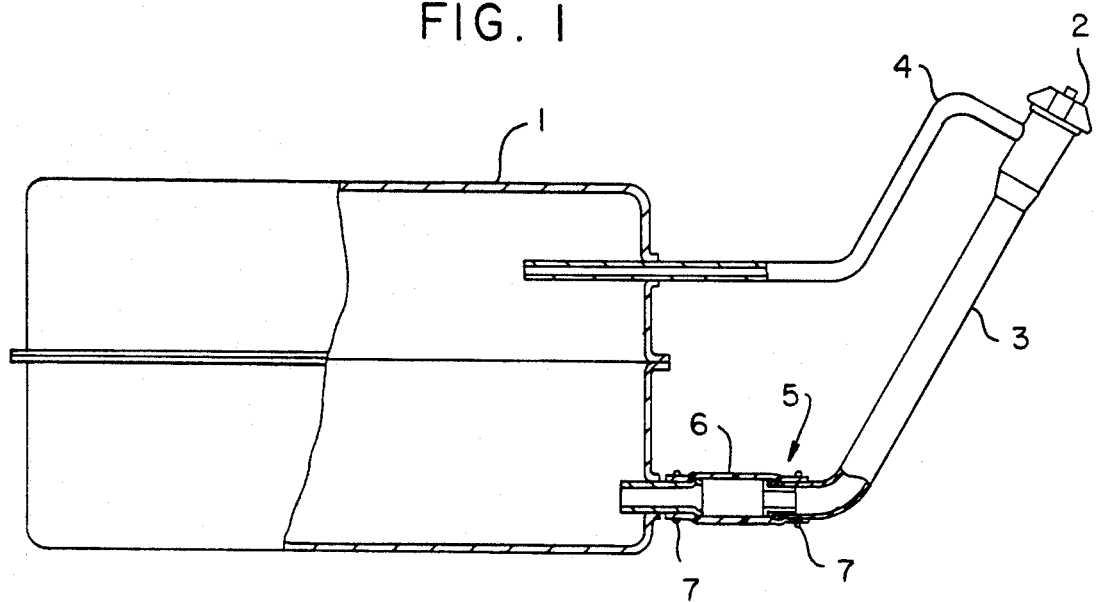
FIG. 1 is a drawing showing as a whole a fuel tank provided with a reverse-flow prevention device.
Figure 2:
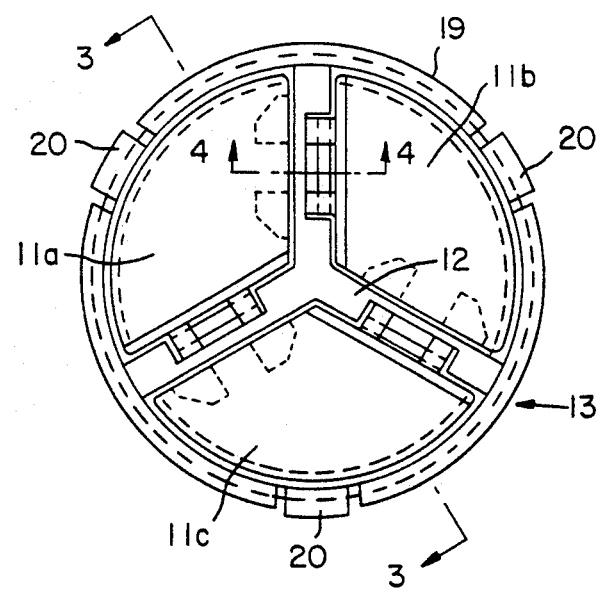
FIG. 2 is a top plan view of the reverse-flow prevention device.
Figure 3:
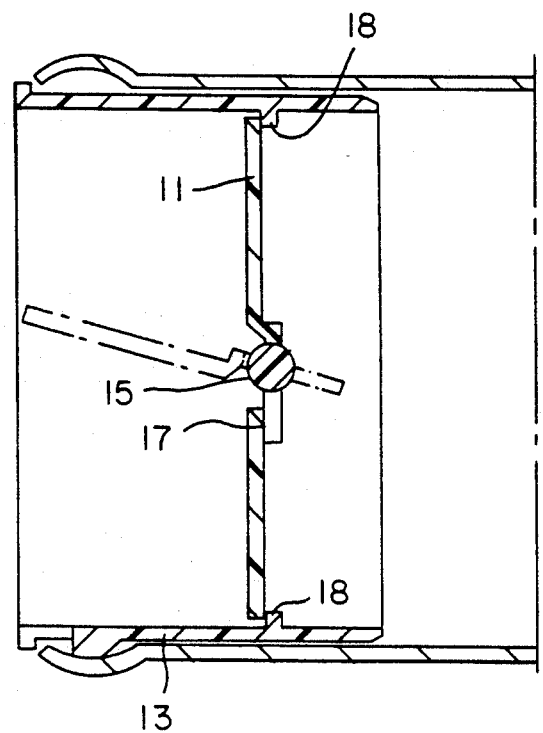
FIG. 3 is a cross-sectional view of the reverse-flow prevention device, taken along a line 3—3 in FIG. 2.

FIG. 1 is a partially broken-away elevational view showing a state of a reverse-flow prevention device which is mounted on a fuel tank of an automobile. Referring to FIG. 1, the fuel tank 1 is provided with a filler pipe 3 which is attached with a cap 2 at its top end and a breather pipe 4. The reverse-flow prevention device 5 of the invention which prevents fuel from flowing from the fuel tank to a filler port, is connected to an end portion of the filler pipe 3 in the vicinity of the lower portion of the fuel tank 1 through fitting projections by means of a rubber hose 6 and check bands 7.

As shown in FIGS. 2 to 6, in the reverse-flow prevention device for the fuel tank, the circular interior space of a valve body 13 is equally divided into three sector-shaped regions (sector angle of 120°, and a support bar 12 is provided in alignment with the lines for dividing the interior space of the valve body 13. The support bar 12, accordingly, has a structure such that it is branched in three directions from its center. Valve discs 11 are formed so as to fit in the above-described sector-shaped regions and are rotatably supported at their one sides by bearings 15 provided on the support bar 12. In order to control the three valve discs 11a, 11b, and 11c to rotate within a range of not more than 75° and in the same direction as one another, the rotation bearings 15 of the support bar 12 are provided with rotation-restriction sections 14 for the valve discs 11.

Each rotation-restriction section 14 includes stopper portions 16a, 16b provided at two circumferential positions of the support bar 12 which retains the shaft portions 23, the stopper portions 16a, 16b being apart from each other by an angularly interval of substantially 180°. The stopper portions 16a, 16b are sector-shaped in cross section with angles of 90°. Each stopper portion is in contact with the valve discs 11 at two sides with the corner interposed therebetween, thereby limiting the valve discs 11a, 11b, 11c to rotation within a range of not more than 90°. The valve discs 11 each involves shaft stopper pieces 17, 17 having stepped portions extending rearward from the bearing portion, which shaft stopper pieces 17 rotate on a side opposite to the rotating side of the valve disc 11 and contact with the support bar 12 so as to fulfill a stopper function for rotating the valve disc 11 in the same direction. Further, the valve body 13 is provided with control projections 18 on its inner surface, the control projections being so constructed as to operate as a stopper when the top ends of the valve discs 11 are in contact with the control projections 18 at the time of completing their rotation. The valve body 13 is formed with a flange 19 on its inlet side and also with fitting projections 20 at three positions on its side wall, for fitting the valve body with the filler pipe.

Figure 7:
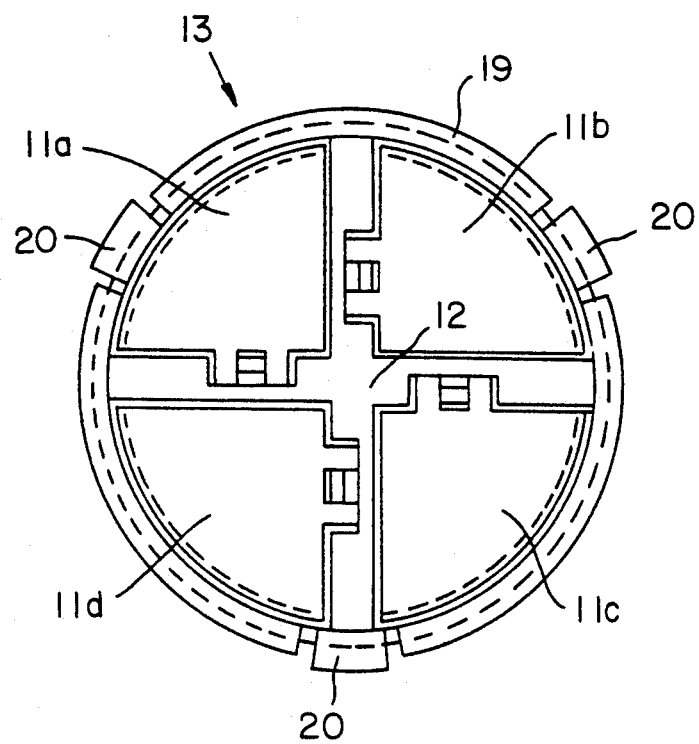
FIG. 7 is a top plan view illustrating a reverse-flow prevention device according to another embodiment of the invention.

FIG. 7 is a top plan view showing another embodiment of the invention, wherein the circular interior space of a valve body 13 is equally divided into four sector-shaped regions. A cross-shaped support bar 12 is provided in alignment with the lines for dividing the interior space of the valve body. Four valve discs 11a to 11d having configurations to closely fit in the sector-shaped regions with angles of 90° and rotating around the support bar 12 are provided in the valve body 13.

As mentioned above, in case of three or more valve discs, the following advantages can be obtained. At first, when the valve discs 11 are two, a resistance against the fuel flow is largely changed according as the valves are located horizontally or vertically. This is because, when the fuel is flowing through the lower half portion of the filler pipe, the valve disc which obstructs the fuel flow is not dipped in the fuel or half dipped therein in the case of two valve discs. However, when the valve discs are three or more, even if the valve discs are attached at any angle, at least one of three valve discs are dipped in the fuel or most portions of two valve discs among the three valve discs are always dipped in the fuel.

In order to rectify a turbulent flow of the fuel, it is requisite to provide a guide plate in the fuel flow. In case of three valve discs, at least one valve disc exists in the fuel flow, which valve disc separates to decrease swirls in the fuel flow, thereby rectifying the flow of the fuel as the guide plate. However, in case of two valve discs, it is impossible to rectify the fuel flow if the valve discs are attached at an unfavorable angle.

As the interior space of the valve body is divided into more regions, a larger rectifying effect can be expected, whereas when the number of the valve discs becomes larger, a substantial opening area of the valve body is more reduced. Consequently, the number of the valve discs is preferably within a range to six at the most. Strictly speaking, it is not ordinarily but sometimes the valve discs have to be positioned such that one of the three valve discs takes a position facing in an unfavorable direction. However, the valve disc positioned in the unfavorable direction occupies a part not more than one third of the whole valve discs and the remaining part not less than two thirds of the whole valve discs acts a proper function to restrain the fuel from flowing reversely. The one valve disc performs a valve-acting function so that the valve discs according to the invention can substantially prevent the reverse flow of the fuel.

In this case, though it is thought of that a response of the valve disc is delayed, since inertial mass with respect to each valve disc is small, the response speed is raised. In this respect, the larger the number of the valve discs becomes, the better response can be obtained. The conventional two valve discs which are retained by the springs cannot provide desirable responsibility.

In case of one valve disc, there occurs a possibility that the fuel will not be fed because of rotational failure of the shaft, as mentioned above. Accordingly, in case of three valve discs, since at least one of the three valve discs is always opened, a possibility that the fuel will not be supplied can be avoided.

Additionally, in this embodiment, the reason why ordinarily-used shaft and bearing are not applied in the rotational portion of the device is that a tar material or the like is liable to cohere in the gap between the shaft and the bearing. It is needless to say that the ordinary shaft and bearing sufficiently meet the requirements of the invention, but they are not used in this embodiment for ensuring more safety of the device.

The valve discs of the three-division type according to the invention will be explained hereinafter.

Figure 8:
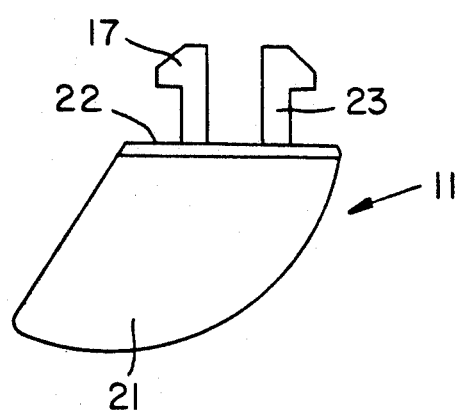
FIG. 8 is a top plan view of one valve disc of the reverse-flow prevention device according to the first embodiment of the invention.
Figure 9:
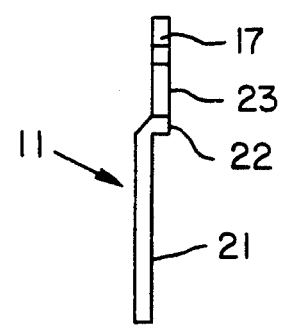
FIG. 9 is a side view of the same shown in FIG. 8.

FIG. 8 is a top plan view of the valve disc of the first embodiment, and FIG. 9 is a side view of the same.

Figure 4:
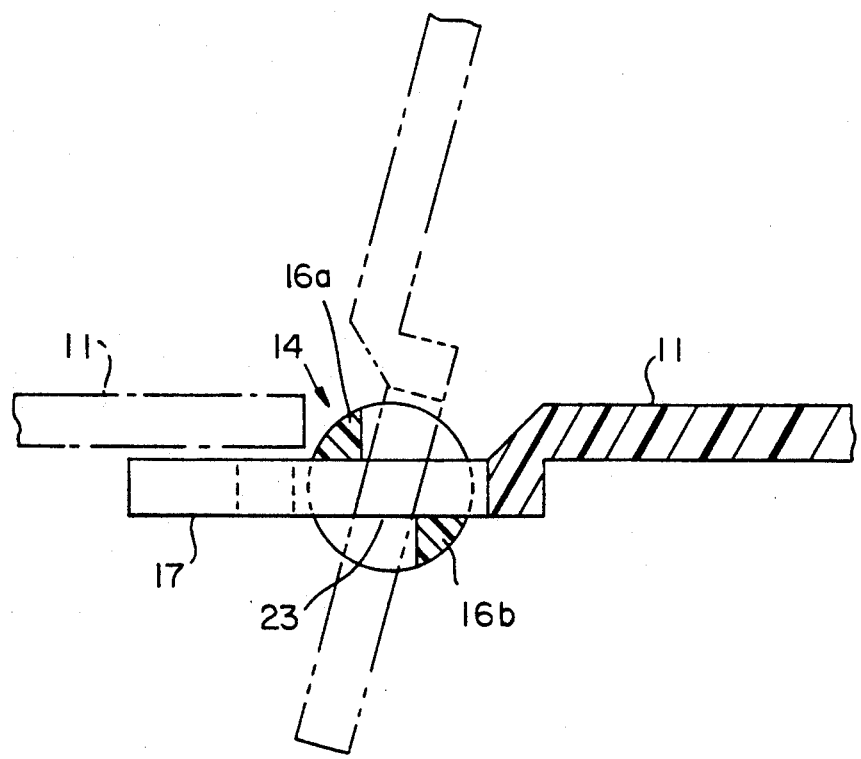
FIG. 4 is an enlarged cross-sectional view of the reverse-flow prevention device, taken along a line 4—4 in FIG. 2.
Figure 5:
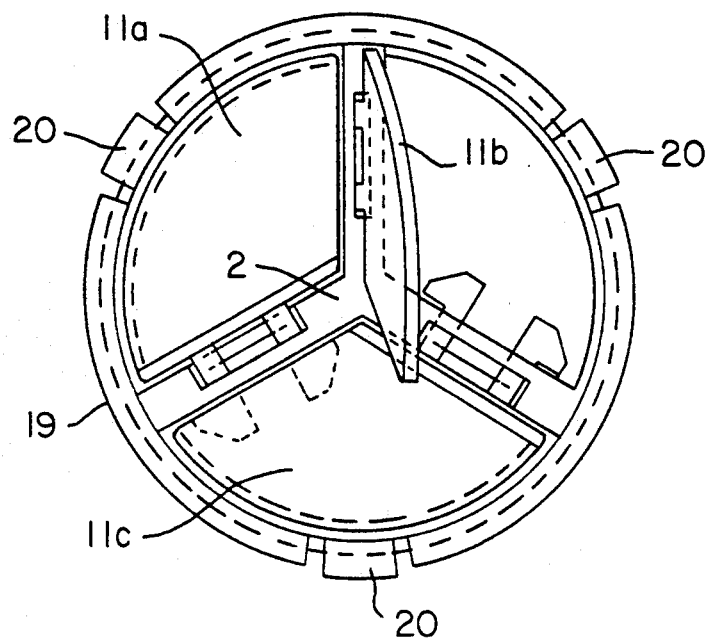
FIG. 5 is a top plan view of the reverse-flow prevention device in a state that one valve disc thereof is opened.
Figure 6:
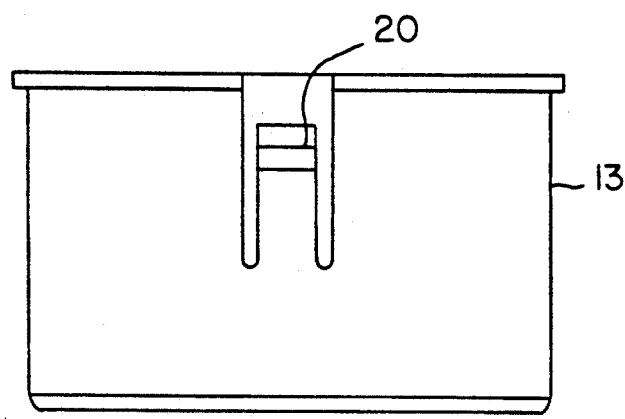
FIG. 6 is a side view of the reverse-flow prevention device.

As shown in the drawings, a valve-movable portion 21 of the valve disc 11 is formed from a sector-shaped plate, and it is capable of closing the sector-shaped region of the circular interior space of the valve body 13. The proximal side edge of the valve-movable portion 21 operates as a rotational locus restriction portion 22 which abuts on the rotation-restriction section 14 of the support bar 12, as shown in FIG. 4. Two shaft portions 23 are projected from the rotational locus restriction portion 22 in a direction opposite to the valve-movable portion 21. Top ends of the shaft portions 23 are in a hooked configuration and extended in directions opposite to each other, whereby the top ends of the shaft portions operate as the shaft stopper pieces 17 to engage with the support bar 12.

Figure 10:
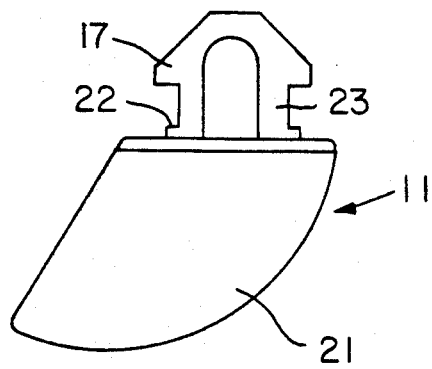
FIGS. 10 to 13 are top plan views illustrative of various valve discs in the modifications of the reverse-flow prevention according to the invention.

FIG. 10 is a top plan view of the second embodiment. In this embodiment, projections provided at the proximal ends of shaft portions 23 operates as the rotational locus restriction portion 22 so as to reduce friction between the valve disc and the support bar 12, and a rotation-restriction section 14 acts to restrict a rotational angle of a valve-movable portion 21 within a range of about 75°. Further, since distal ends of stopper portions 17 are connected to each other, a structural strength of the stopper portions is enhanced and its durability is thus increased.

Figure 11:
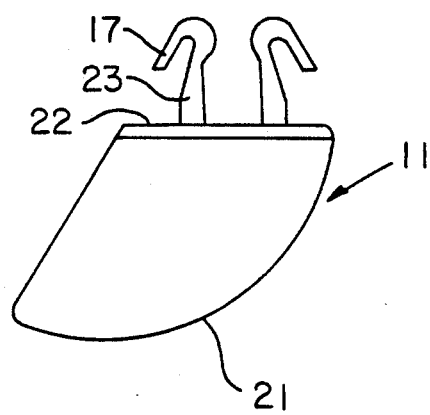

FIG. 11 illustrates a third embodiment of the invention, in which because the stopper portions 17 are hooked at a larger extent than those of FIG. 8, they can be bent more largely so that it is possible to readily mount the valve disc on the support bar 12.

Figure 12:
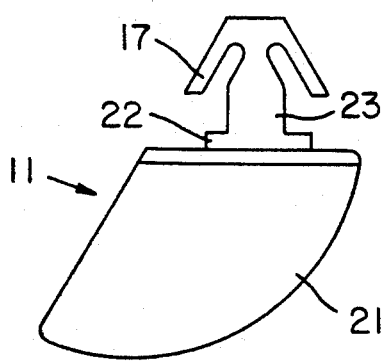

In a fourth embodiment of FIG. 12, the shaft portion 23 is formed with one wide shaft and its top end is provided with hooked stopper portions 17 on both right and left sides thereof. This is of a type in which the valve disc is mounted on the support bar 12 by bending only the stopper portions 17.

Figure 13:
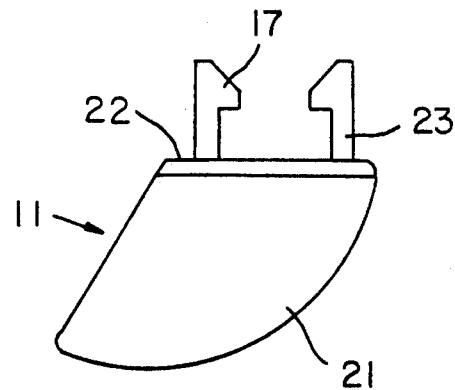

In a fifth embodiment of FIG. 13, two shaft portions 23 are provided with hooked stopper portions 17 extending inwardly, i.e., in directions opposite to those of FIG. 8.

FIGS. 2 to 5 show a mounting state and an operating state of the valve disc of the first embodiment shown in FIGS. 8 and 9. The function of the valve disc of the first embodiment is as mentioned above.

With the above-described structure of the reverse-flow preventing device for the fuel tank, there can be obtained effects which will be listed below.

① Since it is unnecessary to take into account an attachment direction of the reverse-flow prevention device having the valve discs according to the invention, which can be distinguished from the conventional device with one or two valve discs, the device of the invention operates efficiently, and moreover it becomes easy to automatically assemble the valve discs by improving the configurations of the valve discs.

② It is possible to eliminate a possibility that the valve discs cannot be rotated owing to adhesion of tar substance or different matters during supplying the fuel.

③ The reverse-flow prevention device is also capable of rectifying the flow of the fuel during supply of the fuel so that the fuel flows in a smooth and stable state, which results in no necessity of providing a rectifier, whereby a cost reduction can be achieved.

What is claimed is:

1. A reverse-flow preventing device for a fuel tank comprising a valve body of which circular interior space is divided into three to six sector-shaped regions by a support bar provided in said valve body, said support bar being branched so as to be in alignment with all division lines which divide said interior space into sector-shaped regions and provided with fitting openings, and three to six valve discs having configurations to be closely fitted in said sector-shaped divided regions, said discs being rotatable around said fitting openings of said support bar, characterized in that bearings of said support bar for rotation of the valve discs are provided with rotation-restriction sections for controlling the valve discs to rotate within a range of not more than 90° as well as in one direction; and wherein the valve discs each comprise a plate-like valve-movable portion capable of closing said sector-shaped regions of the valve body, a rotational locus restriction portion which is provided on an edge of the proximal side of said valve-movable portion so as to abut on the rotation-restriction section of said support bar, shaft portions projecting from said edge of said proximal side of said rotational locus restriction portion in a direction opposite to and parallel with said valve-movable portion, and hooked stopper portions provided at the distal ends of said shaft portions so as to fit into said openings of said support bar.

* * * * *